(12) United States Patent
Bindocci et al.

(10) Patent No.: US 6,874,372 B2
(45) Date of Patent: Apr. 5, 2005

(54) DEVICE FOR MEASURING THE FLOW RATE OF FLUIDS

(75) Inventors: Sabrina Bindocci, San Mauro Torinese (IT); Mario Baccanini, Sant' Antonino Di Saluggia (IT); Fulvio Benna, Grugliasco (IT); Alberto Petrone, Collegno (IT); Danilo Beraldo, Collegno (IT); Paolo Ravedati, Moncalieri (IT); Paolo Da Pont, Turin (IT)

(73) Assignee: Elbi International S.p.A., Turin (IT)

( * ) Notice: Subject to any disclaimer, the term of this patent is extended or adjusted under 35 U.S.C. 154(b) by 0 days.

(21) Appl. No.: 10/465,551

(22) Filed: Jun. 20, 2003

(65) Prior Publication Data

US 2004/0255693 A1 Dec. 23, 2004

(51) Int. Cl.[7] ................................................ G01F 1/78
(52) U.S. Cl. ................................................. 73/861.352
(58) Field of Search ....................... 73/861.352, 861.33, 73/861.35

(56) References Cited

U.S. PATENT DOCUMENTS 3,807,229 A * 4/1974 Chiles ......................... 73/203
3,958,447 A * 5/1976 Baker et al. ................ 73/32 R

* cited by examiner

Primary Examiner—Max Noori
Assistant Examiner—Jewel V. Thompson
(74) Attorney, Agent, or Firm—Sughrue Mion, PLLC

(57) ABSTRACT

The device comprises a tubular stator intended to be fixed in a pipe, so as to be traversed, in use, by said stream of fluid, and in which there is axially mounted a rotor which has a central hub from which extends a plurality of blades and which is capable of being operated in rotation by said stream, like a turbine, at a velocity variable according to the flow rate, and at least one permanent magnet integral with the rotor, disposed eccentrically with respect to the axis of rotation of said rotor. Fixed to the hub of the rotor is a shaped support bush mounted rotatable about a fixed pin or shaft which extends, projecting in the opposite direction to the operational direction of flow of the stream, from a central support integral with the axial outlet portion of the stator. The magnet is held in a housing defined between the support bush and the rotor.

8 Claims, 2 Drawing Sheets

DEVICE FOR MEASURING THE FLOW RATE OF FLUIDS

BACKGROUND OF THE INVENTION

The present invention relates to a device for measuring the flow rate of a stream of fluid in a pipe. More specifically, the subject of the invention is a flow rate measuring device comprising a tubular stator intended to be fixed in a pipe so as to be traversed, in use, by said stream, and in which there is axially mounted a rotor which has a central hub from which extends a plurality of blades and which is capable of being operated by said stream, like a turbine, at a velocity variable according to its flow rate, and at least one permanent magnet integral with the rotor and disposed eccentrically with respect to the axis of rotation of the rotor.

SUMMARY OF THE INVENTION

The aim of the present invention is to provide a flow rate measuring device of this type, having a simplified and more easily assembled structure, and with highly reliable operation.

These and other aims are fulfilled according to the invention by a flow rate measuring device.

Figure 1:
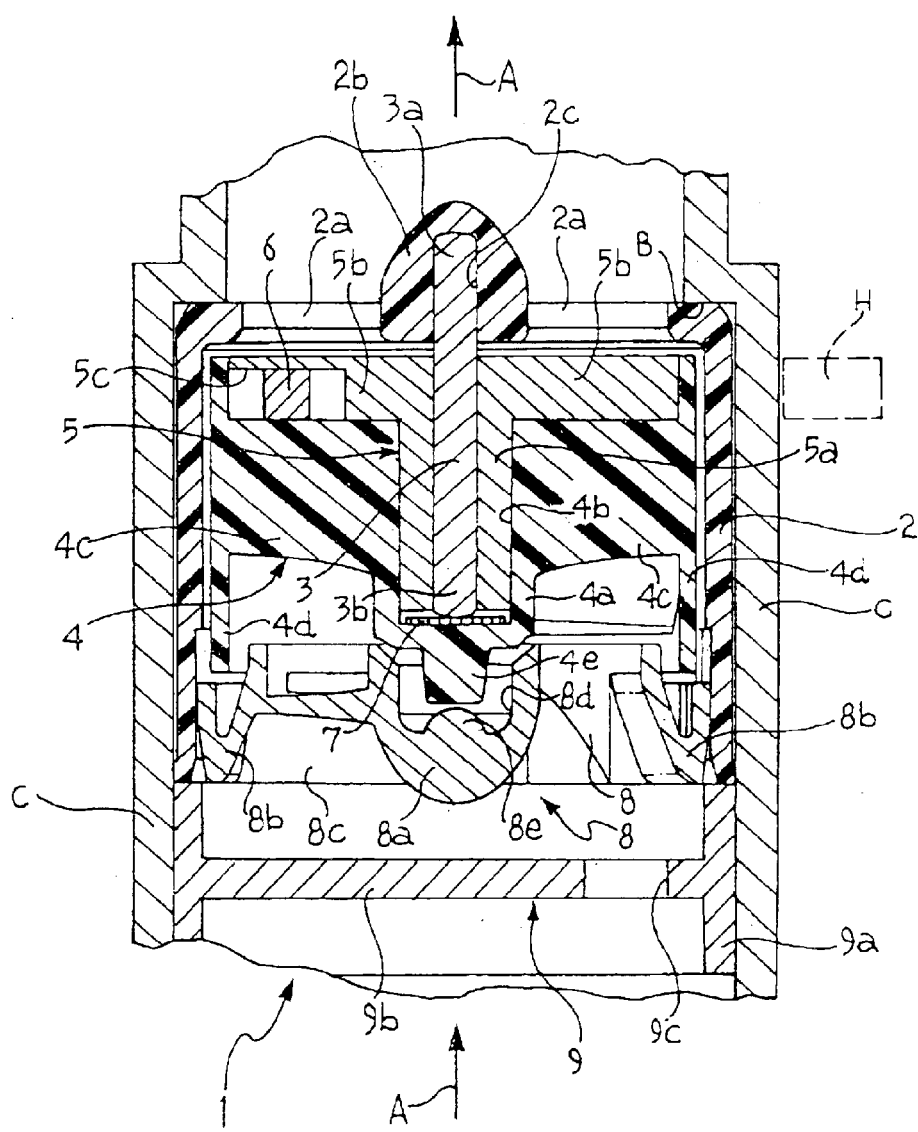
Figure 2:
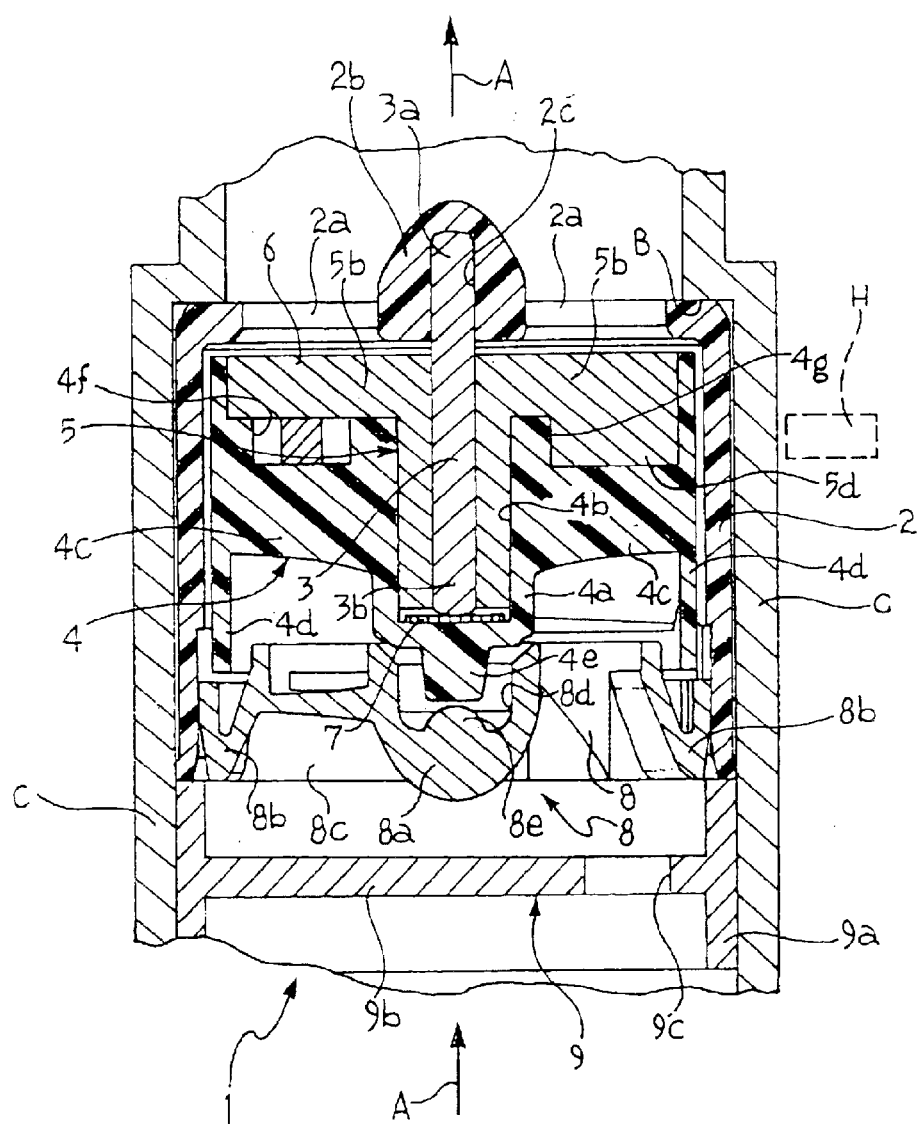

Further characteristics and advantages of the invention will become clear from the following detailed description, provided purely by way of non-limiting example, with reference to the appended drawings, in which FIGS. 1 and 2 show in axial section two devices according to the invention.

DETAILED DESCRIPTION OF THE INVENTION

In FIG. 1, C indicates a pipe intended to be traversed, in use, by a stream of fluid, for example a liquid, flowing in the direction indicated by the arrows A.

With reference to the drawings, in the upper part the pipe C has a narrowing of cross-section, at which a shoulder B is defined.

The reference 1 indicates as a whole a flow rate measuring device according to the invention, mounted in the pipe C, upstream of and butting against the shoulder B.

The flow rate measuring device 1 comprises a tubular stator 2, for example of moulded plastics material, disposed in abutment against the shoulder B. In use, the stator is traversed by the stream which flows in the pipe C. The rearward or outlet end of the stator 2 forms a plurality of radial spokes 2a, which converge towards and connect with a central formation 2b. The spokes 2a are for example in the form of flat radial bars, and contribute to rectifying the flow at the outlet of the flow rate measurer 1.

The central formation 2b, which is conveniently produced in one piece with the stator 2 and the associated spokes 2a, has a central axial cavity 2c in which is set one end 3a of a fixed shaft or pin 3. The shaft or pin 3 extends, projecting from the formation 2b, in the direction of the inlet end of the flow rate measurer 1, or in the opposite direction to the operating direction of flow of the stream in the pipe C.

In FIG. 1, the reference 4 indicates as a whole a rotor which has a central hub 4a in which is defined an axial cavity 4b, open towards the rearward end of the flow rate measurer 1, and blind or closed towards the inlet end of the measurer 1.

The rotor 4 has a plurality of (for example four) blades-4c which extend between the hub 4a and a peripheral cylindrical ring 4d.

The rotor is conveniently produced from a moulded plastics material.

The reference 5 indicates a rotating support substantially like a bush, with a tubular cylindrical portion 5a set in the cavity 4b of the rotor 4 and rotatable about the shaft or pin 3.

The support 5 further has at the rear a pair of opposed transverse appendages 5b, which extend in corresponding recesses arranged on the rearward side of the rotor 4. In one of these appendages 5b (the one on the left as seen in FIG. 1) a notch 5c is provided which, together with a rearward portion of the rotor 4, defines in the assembly a receptacle in which is housed a permanent magnet 6. The magnet 6 is preferably fixed in said receptacle, for example by means of a drop of adhesive or by other means or in other ways which are known per se.

The magnet 6 is eccentric with respect to the axis of rotation of the rotor 4 and the appendage 5b of the support 5 opposite to the magnet has sufficient mass to balance it.

As an alternative, the shaft 3 and the rotor 4 may be produced from wear-resistant materials.

The reference 7 indicates a small plate of wear-resistant material fixed to the bottom wall of the cavity 4b of the rotor 4.

The arrangement so far described is such that when the plate 7 presses against the free end 3b of the shaft or pin 3, the rearward side of the assembly formed by the rotor 4 and the bush support 5 is axially spaced with respect to the formation 2b of the stator 2 and to the associated spokes 2a.

Upstream of the rotor 4 in the stator 2 is fixed a flow deflector of a type which is known per se, indicated as a whole by 8. The deflector comprises a central body 8a, having a substantially ogival profile, coaxial with an outer ring 8b coupled for example as a snap fit in the inlet end of the stator 2. Between the central body 8a and the outer ring 8b the deflector 8, in a manner which is known per se, has a plurality of (for example three) twisted fixed blades 8c, angularly spaced at equal distances.

On the side facing towards the rotor the central body 8a of the deflector 8 has a cavity 8d, in which extends with axial clearance a terminal protuberance 4e of the hub of the rotor 4. A raised portion 8e provided in the bottom wall of the cavity 8d of the deflector 8 acts as a limiting means for the axial displacement of the assembly formed by the rotor 4 and the support 5 relative to the pin 3. The shape of the raised portion 8e is such that any contact between the raised portion and the rotor 4 occurs on a substantially dot-like surface, in order to limit friction.

Upstream of the deflector 8 in the pipe C a regulating member 9 is disposed, comprising a peripheral ring 9a and a disc-like portion 9b. In the latter, a plurality of (for example three) openings 9c is provided for the passage of the stream of liquid.

The angular position of the regulating member 9 relative to the flow deflector 8 is conveniently adjustable, in particular so as to vary the relative angular position of the openings 9c with respect to the passages defined between the blades of the deflector 8. This makes it possible to regulate the point of the work characteristic of the flow rate measuring device, or the number of revolutions of the rotor 4 per unit of volume of fluid as the flow rate of the stream in the pipe C varies.

In operation, the stream which impinges on the rotor 4 causes it to rotate at a velocity variable according to the flow rate. The rotation of the rotor 4 includes the corresponding rotation of the associated permanent magnet 6. A magnetic sensor, such as a Hall effect sensor or a Reed switch disposed inside or outside the pipe C, makes it possible to generate a pulse at each passage or revolution of the magnet.

Under the action of the fluid thrust exerted by the stream flowing in the pipe C, the rotor is pressed away from the deflector 8, so that the plate 7 presses against the free end of the shaft or pin 3.

The preliminary adjustment of the angular position of the regulating member 9 makes it possible to vary the number of pulses/unit of liter volume which are generated as the flow rate of the stream of fluid varies.

In the variant shown in FIG. 2, the magnet 6 extends in a cavity 4f which is provided in the rearward part of the installation 4 and which is closed by an appendage 5b of the support 5. The other transverse appendage of the support has a protuberance 5d which extends in a corresponding rearward receptacle 4g of the rotor 4, to balance the mass of the magnet 6.

Also in the variant according to FIG. 2, the magnet 6 is preferably fixed, for example by means of a drop of adhesive, to the support 5 (or to the rotor 4).

The flow rate measurer described above has a simple structure, that can be produced and assembled economically, and very reliable operation.

With the principle of the invention remaining unchanged, the embodiments and the details of production may of course vary widely with respect to what has been described and illustrated purely by way of non-limitative example, the invention extending to all products which are of equal utility, owing to the same innovative concepts.

What is claimed is:

1. A device for measuring the flow rate of a stream of fluid in a pipe, comprising a tubular stator intended to be fixed in the pipe so as to be traversed, in use, by said stream, a rotor axially mounted within the stator, the rotor having a central hub from which extends a plurality of blades and which is capable of being operated in rotation by said stream, like a turbine, at a velocity variable according to the flow rate, and at least one permanent magnet integral with the rotor, disposed eccentrically with respect to the axis of rotation of said rotor; there being fixed to the hub of the rotor a shaped support bush mounted rotatable about a fixed pin or shaft which extends, projecting in the opposite direction to the operational direction of flow of said stream, from a central support integral with the axial outlet portion of the stator; said at least one magnet being held in a housing defined between the support bush and the rotor.

2. A device according to claim 1, wherein the support bush has a tubular portion fixed to the hub of the rotor and at least one transversely protruding portion, facing a rearward portion of the rotor; there being defined in said transverse portion of the bush a receptacle in which said at least one magnet is received.

3. A device according to claim 1, wherein the support bush has a tubular portion fixed to the hub of the rotor; there being defined in a rearward portion of said rotor a receptacle in which said at least one magnet is received.

4. A device according to claim 1, wherein the unit formed by the rotor and the support bush is axially translatable with respect to said shaft or pin and has stop means capable of butting against the free end of said shaft or pin under action of a thrust which, in use, is exerted axially on the rotor by said stream of fluid.

5. A device according to claim 4, wherein the hub of the rotor has a blind cavity which extends in the rotor from its rearward side towards the forward side; there being fixed at the bottom of said cavity a small plate of wear-resistant material, intended to be disposed, in operation, in contact against the free end of said shaft or pin.

6. A device according to claim 3, wherein said shaft or pin and the rotor are produced from wear-resistant materials.

7. A device according to claim 1, wherein upstream of the rotor, there is connected to the stator a flow deflector comprising a plurality of angularly spaced, twisted fixed blades.

8. A device according to claim 5, wherein upstream of the flow deflector a regulating member is disposed, having a plurality of angularly spaced openings; the angular position of said regulating member being adjustable relative to that of said deflector.

* * * * *